United States Patent
Park et al.

(10) Patent No.: US 9,544,593 B2
(45) Date of Patent: Jan. 10, 2017

(54) VIDEO SIGNAL DECODING METHOD AND DEVICE

(75) Inventors: Seung Wook Park, Seoul (KR); Jae Hyun Lim, Seoul (KR); Jung Sun Kim, Seoul (KR); Joon Young Park, Seoul (KR); Young Hee Choi, Seoul (KR); Jae Won Sung, Seoul (KR); Byeong Moon Jeon, Seoul (KR); Yong Joon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 1093 days.

(21) Appl. No.: 13/517,313

(22) PCT Filed: Dec. 15, 2010

(86) PCT No.: PCT/KR2010/008978
§ 371 (c)(1),
(2), (4) Date: May 10, 2013

(87) PCT Pub. No.: WO2011/074874
PCT Pub. Date: Jun. 23, 2011

(65) Prior Publication Data
US 2014/0003522 A1    Jan. 2, 2014

Related U.S. Application Data

(60) Provisional application No. 61/288,321, filed on Dec. 20, 2009, provisional application No. 61/288,325, (Continued)

(30) Foreign Application Priority Data

Dec. 13, 2010   (KR) .................. 10-2010-0126941

(51) Int. Cl.
*H04N 19/109*   (2014.01)
*H04N 19/11*    (2014.01)
(Continued)

(52) U.S. Cl.
CPC ...... *H04N 19/00733* (2013.01); *H04N 19/105* (2014.11); *H04N 19/109* (2014.11);
(Continued)

(58) Field of Classification Search
CPC ............ H04N 19/00733; H04N 19/105; H04N 19/109; H04N 19/46; H04N 19/51
(Continued)

(56) References Cited

U.S. PATENT DOCUMENTS 7,813,428 B2    10/2010 Yoon et al.
2006/0291562 A1*   12/2006 Lee et al. .................. 375/240.16
(Continued)

FOREIGN PATENT DOCUMENTS

CN          1939066 A    3/2007
KR   10-2007-0007326 A   1/2007
(Continued)

OTHER PUBLICATIONS

Chinese Office Action dated Sep. 28, 2014 for Chinese Appln. No. 201080063766.4, with English Translation, 16 pages.
(Continued)

*Primary Examiner* — William C Vaughn, Jr.
*Assistant Examiner* — Jae N Noh
(74) *Attorney, Agent, or Firm* — Fish & Richardson P.C.

(57) ABSTRACT

According to the present invention, when the block merge flag of the current prediction block specifies that the motion information of the current prediction block is acquired using block merging, the motion information of the current prediction block is acquired from the motion information of the neighboring block, a reference block of a reference picture is acquired using the motion information of the current prediction block, the prediction value of the current prediction block is acquired using the reference block, and the current prediction block is restored using the residual of the
(Continued)

current prediction block and the prediction value of the current prediction block.

16 Claims, 10 Drawing Sheets

Related U.S. Application Data filed on Dec. 20, 2009, provisional application No. 61/301,588, filed on Feb. 4, 2010.

(51) Int. Cl.

| | |
|---|---|
| *H04N 19/52* | (2014.01) |
| *H04N 19/583* | (2014.01) |
| *H04N 19/105* | (2014.01) |
| *H04N 19/46* | (2014.01) |
| *H04N 19/51* | (2014.01) |
| *H04N 19/523* | (2014.01) |
| *H04N 19/577* | (2014.01) |
| *H04N 19/573* | (2014.01) |

(52) U.S. Cl.
CPC .............. *H04N 19/46* (2014.11); *H04N 19/51* (2014.11); *H04N 19/52* (2014.11); *H04N 19/523* (2014.11); *H04N 19/577* (2014.11); *H04N 19/573* (2014.11)

(58) Field of Classification Search
USPC .................................................. 375/240.16
See application file for complete search history.

(56) References Cited

U.S. PATENT DOCUMENTS

| | | | |
|---|---|---|---|
| 2007/0211798 A1 | 9/2007 | Boyce et al. | |
| 2008/0267292 A1 | 10/2008 | Ito | |
| 2008/0291997 A1 | 11/2008 | Yoon et al. | |
| 2010/0091846 A1* | 4/2010 | Suzuki ................ | H04N 19/105 375/240.12 |
| 2010/0142617 A1 | 6/2010 | Koo et al. | |
| 2010/0220788 A1* | 9/2010 | Wittmann et al. ....... | 375/240.16 |
| 2010/0239002 A1* | 9/2010 | Park et al. ............... | 375/240.12 |
| 2011/0002388 A1* | 1/2011 | Karczewicz ..... | H04N 19/00733 375/240.15 |

FOREIGN PATENT DOCUMENTS

| | | |
|---|---|---|
| KR | 10-2007-0012201 A | 1/2007 |
| KR | 10-2009-0111833 A | 10/2009 |
| WO | WO 2005/099275 A2 | 10/2005 |
| WO | WO 2005/099276 A2 | 10/2005 |
| WO | WO 2007/011189 A1 | 1/2007 |
| WO | WO 2008/088175 A1 | 7/2008 |

OTHER PUBLICATIONS

European Search Report dated May 21, 2013 for Application No. 10837870.4, 9 pages.
Jachyun Lim, Et Al.: "Extended merging scheme using motion-hypothesis prediction", 2. JCT-VC Meeting; Jul. 21, 2010-Jul. 28, 2010; Geneva; (Joint CollaborativeTeam on Video Coding of ISO/IEC JTC1/SC29/WG11 and ITU-TSG.16); URL:http://wftp3.itu.int/av-arch/jctvc-site/,, No. JCTVC-B023, Jul. 23, 2010, XP030007603, ISSN:0000-0048, *the whole document*.
Martin Winken (Fraunhofer HHI) Et Al.: "Video coding technology proposal by Fraunhofer HHI", 1. JCT-VC Meeting; Apr. 15, 2010-Apr. 23, 2010; Dresden; (JointCollaborative Team on Video Coding of ISO/IEC JTC1/SC29/WG11 and ITU-TSG.16); URL: http://wfrp3.itu.int/av-arch/jctvc-site/,, No. XP030007556, Apr. 24, 2010, XP030007557, ISSN: 0000-0049, *paragraph [2.1.3]*.
PCT Written Opinion and International Search Report dated Aug. 3, 2011 for Application No. PCT/KR2010/008978, with English translation, 12 pages.

* cited by examiner

VIDEO SIGNAL DECODING METHOD AND DEVICE

CROSS REFERENCE TO RELATED APPLICATIONS

This application is a U.S. National Phase Application under 35 U.S.C. §371 of International Application PCT/KR2010/008978, filed on Dec. 15, 2010, which claims the benefit of U.S. Provisional Application No. 61/288,321, filed on Dec. 20, 2009, 61/288,325, filed on Dec. 20, 2009, and 61/301,588, filed on Feb. 4, 2010, and claims the benefit of Korean Application No. 10-2010-0126941, filed on Dec. 13, 2010, the entire contents of which are hereby incorporated by reference in their entireties.

TECHNICAL FIELD

The present invention relates to a video signal decoding method and device using inter-prediction.

BACKGROUND ART

In transmission of an encoded video signal to a decoder, a method of removing temporal redundancy and spatial redundancy in order to increase video signal coding efficiency, that is, intra-prediction or inter-prediction is performed.

DISCLOSURE

Technical Problem

An object of the present invention is to efficiently process a video signal using inter-prediction.

Another object of the present invention is to efficiently process a video signal by deriving motion information at a decoder without coding the motion information during inter-prediction.

Another object of the present invention is to improve motion compensation performance using an accurate motion vector.

Another object of the present invention is to efficiently process a video signal by reducing ghost effect during inter-prediction.

Another object of the present invention is to efficiently process a video signal by compensating for an illumination difference between a current picture and a reference picture.

Technical Solution

To achieve the objects, the present invention proposes a video signal decoding method that generates various motion vector candidates during inter-prediction and acquires an accurate motion vector from the motion vector candidates.

The present invention proposes a video signal decoding method that derives motion information of the current prediction block from motion information of a neighboring block using block merging during inter-prediction.

The present invention proposes a video signal decoding method that acquires a pixel value of a reference block using a motion vector having decimal pixel resolution and an interpolation filter.

The present invention proposes a video signal decoding method that acquires a predictor of the current prediction block by applying an adaptive weight to the pixel value of the reference block.

The present invention proposes a video signal decoding method that compensates for an illumination difference between a current picture and a reference picture using a template region of the current prediction block and a template region of the reference block.

Advantageous Effects

According to embodiments of the present invention, it is possible to reduce the number of bits of a motion vector difference to be encoded and to improve the accuracy of restoration of the original image by acquiring an accurate motion vector from motion vector candidates for inter-prediction. Furthermore, the number of bits necessary to encode motion information of the current prediction block can be reduced using block merging during inter-prediction. In addition, a residual of the current prediction block can be decreased using a motion vector having decimal pixel resolution and an interpolation filter. Moreover, the residual of the current prediction block can be reduced by applying a weight to a reference block similar to the current prediction block.

BEST MODE FOR CARRYING OUT THE INVENTION

Figure 1:
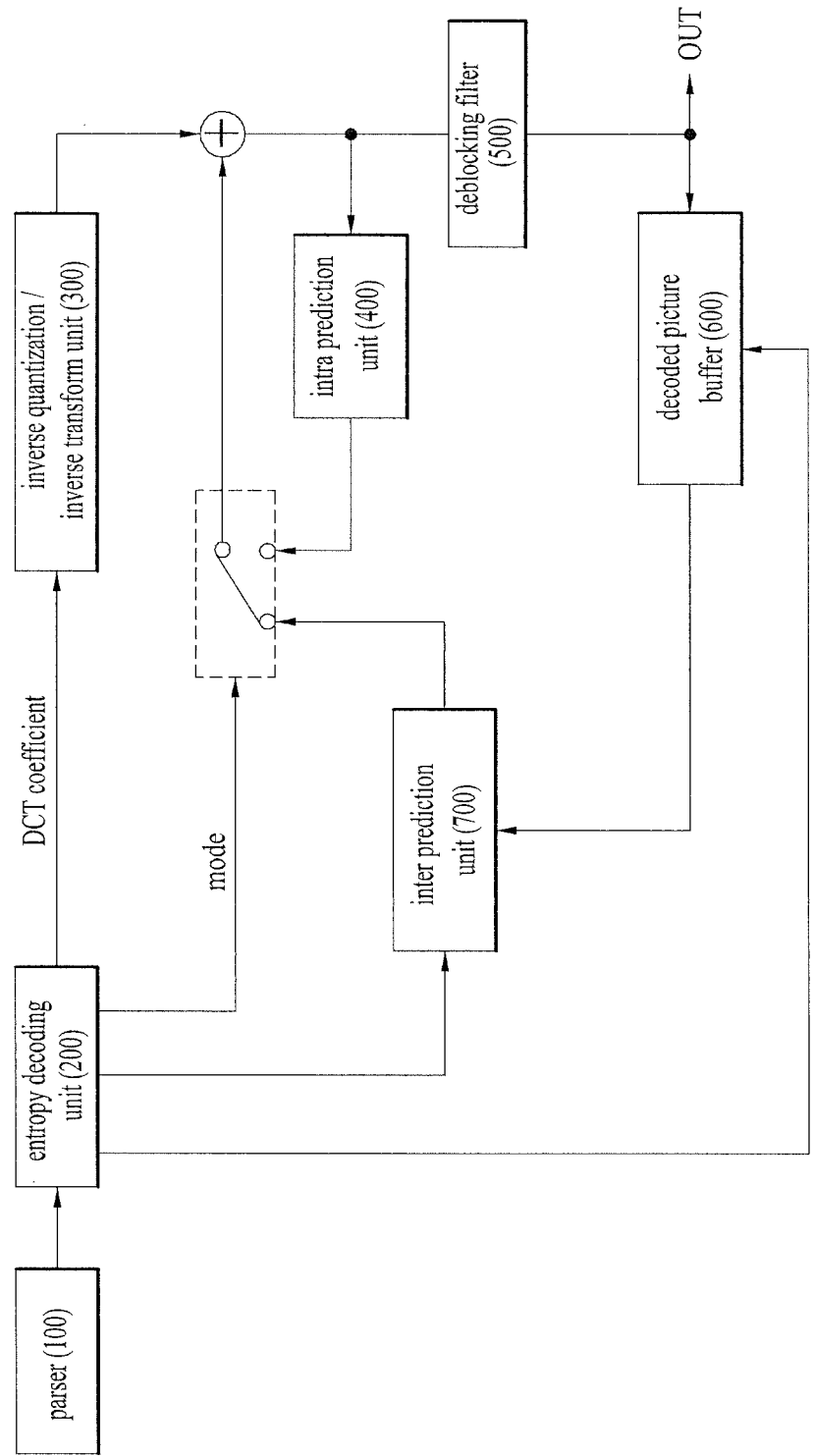
FIG. 1 is a block diagram of a video signal decoding apparatus to which the present invention is applicable.

According to an aspect of the present invention, a video signal decoding method obtains motion information of a current prediction block of a current picture, acquires a reference block of a reference picture using the motion information of the current prediction block, obtains a predictor of the current prediction block using the reference block, and restores the current prediction block using the predictor of the current prediction block and a residual of the current prediction block.

The motion information of the current prediction block may be obtained by acquiring a block merge flag of the current prediction block and acquiring the motion information of the current prediction block using motion information of a neighboring block when the block merge flag indicates that the motion information of the current prediction block is acquired using block merging.

The motion information of the current prediction block may be obtained by checking whether motion information of the left neighboring block is equal to motion information of the upper neighboring block and acquiring a left block merge flag of the current prediction block when the motion information of the left neighboring block is not equal to the motion information of the upper neighboring block.

The motion information of the current prediction block may be obtained from the motion information of the left neighboring block when the left block merge flag indicates that the current prediction block is merged with the left neighboring block, and the motion information of the current prediction block may be obtained from the motion information of the upper neighboring block when the left block merge flag indicates that the current prediction block is merged with the upper neighboring block.

The motion information may include a motion vector and a reference picture index, the motion vector having decimal pixel resolution, wherein the decimal pixel resolution corresponds to one of ½ pixel resolution, ¼ pixel resolution and ⅛ pixel resolution.

The reference block of the reference picture may be acquired by generating a signal having decimal pixel resolution of the reference picture using an interpolation filter, wherein the interpolation filter multiplies an input signal thereof by filter coefficients for every pixel and outputs the sum of multiplication results.

The input signal of the interpolation filter may include at least one of integer pixels of the reference picture and a previously generated signal having decimal pixel resolution.

The interpolation filter may be used in the vertical direction, horizontal direction or diagonal direction in consideration of position information on the signal having decimal pixel resolution, wherein the position information on the signal having decimal pixel resolution corresponds to a difference between the position of an integer pixel and the position of the signal having decimal pixel resolution.

The interpolation filter may be specified by interpolation filter identification information, wherein the interpolation filter identification information indicates the type or filter coefficient of the interpolation filter.

The slice type of the current prediction block may correspond to slice B.

The predictor of the current prediction block may be acquired by applying a weight to pixel values of two reference blocks.

The weight may correspond to one of (1,0), (⅔,⅓), (½,½), (⅓,⅔) and (0,1).

MODE FOR INVENTION

Exemplary embodiments of the present invention will be described below with reference to the attached drawings.

Prior to describing the present invention, it is to be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A coding block may be a basic unit for processing a video frame. The coding block may include at least one prediction block. The prediction block may represent a block unit which performs intra-prediction or inter-prediction. An encoder may determine an optimal coding block size or prediction block size according to resolution of video and transmit information about the determined coding block size or prediction block size to a decoder at a block level, slice level or sequence level.

FIG. 1 is a block diagram of a video signal decoding apparatus to which the present invention is applied.

The video signal decoding apparatus may include a parser 100, an entropy decoding unit 200, an inverse quantization/inverse transform unit 300, an intra prediction unit 400, a deblocking filter 500, a decoded picture buffer 600, and an inter prediction unit 700.

The parser 100 parses a received video signal on an NAL basis in order to decode the video signal. In general, one or more sequence parameter sets and picture parameter sets are transmitted to a decoder before being decoded. Here, a NAL header region or an extended region of an NAL header may include various attribute information. A bit stream parsed by the parser 100 is entropy-decoded by the entropy decoding unit 200, and a coefficient, motion information, etc. of each prediction block are extracted. The inverse quantization/inverse transform unit 300 obtains a transformed coefficient by multiplying a received quantized value by a predetermined constant and inversely transforms the coefficient to restore a pixel value. The intra prediction unit 400 performs inter-prediction on a decoded sample in the current picture using the restored pixel value. The deblocking filter 500 is applied to each coded block to reduce block distortion. The deblocking filter 500 smoothes the edge of a block to improve the picture quality of a decoded frame. A filtering process is selected depending on boundary strength and a variation in an image sample around a boundary. Filtered pictures are output or stored in the decoded picture buffer 600 to be used as reference pictures. The decoded picture buffer 600 stores or opens previously coded pictures for inter-prediction. To store a coded picture in the decoded picture buffer 600 or to open the coded picture, frame_num and POC (Picture Order Count) of the picture are used. The inter prediction unit 700 performs inter-prediction using reference pictures stored in the decoded picture buffer 600.

Inter-prediction includes forward direction prediction, backward direction prediction and bi-prediction. The forward direction prediction may correspond to inter-prediction using one reference picture displayed (or output) prior to the current picture in time. One piece of motion information (e.g. a motion vector and reference picture index) can be used for forward direction prediction. The backward direction prediction may correspond to inter-prediction using one reference picture displayed (or output) after the current picture in time. One piece of motion information (e.g. a motion vector and reference picture index) can be used for backward direction prediction. The bi-prediction may correspond to inter-prediction using two reference blocks. The two reference blocks may coexist in the same reference picture or may respectively present in two reference pictures. The reference picture may be displayed (or output) prior to or after the current picture in time. Particularly, the two reference pictures may be respectively displayed (or output) before and after the current picture in time. Two pieces of motion information (e.g. motion vectors and reference picture indexes) can be used for bi-prediction.

A prediction block coded in an inter mode may be divided into symmetrical partitions or asymmetrical partitions, and each partition may be predicted from two reference pictures. The inter prediction unit 700 compensates for a motion of the current block using information transmitted from the entropy decoding unit 200. The inter prediction unit 700 will now be described in detail with reference to FIG. 2.

Figure 2:
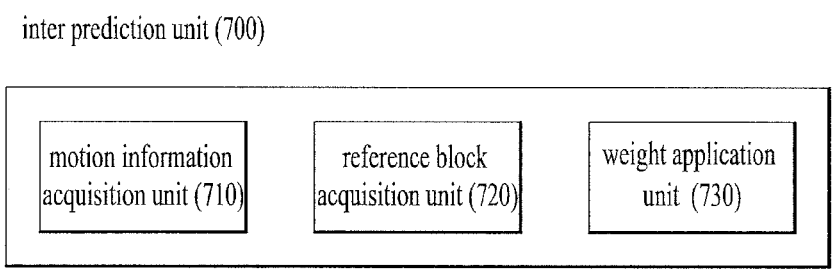
FIG. 2 is a block diagram of an inter prediction unit 700 shown in FIG. 1 according to an embodiment of the present invention.

FIG. 2 is a block diagram of the inter prediction unit 700 shown in FIG. 1 according to an embodiment of the present invention.

Referring to FIG. 2, the inter prediction unit 700 may include a motion information acquisition unit 710, a reference block acquisition unit 720, and a weight application unit 730.

The motion information acquisition unit 710 may acquire motion information of the current prediction block. The motion information may include motion vector information and a reference picture index. The motion vector information may mean a motion vector, a motion vector predictor, or a differential motion vector. The motion vector information may represent index information that specifies the motion vector predictor. The differential motion vector may correspond to a difference between the motion vector and the motion vector predictor. The motion information of the current prediction block may be acquired according to whether the current prediction block is coded in a skip mode.

The skip mode can be defined as a mode in which the current prediction block does not have a motion vector, reference picture index and residual and a pixel value of a reference block in a previously coded reference picture is used when the current prediction block is restored. The pixel value of the reference block may involve motion compensation using a motion vector predictor. In acquisition of the motion vector predictor, the current prediction block can have motion vector information exceptionally when motion vector competition is used, which will be described later.

A skip mode confirmation unit (not shown) may confirm whether the current prediction block is coded in the skip mode.

A method of confirming whether the current prediction block is coded in the skip mode according to an embodiment of the present invention can use skip indication information. The skip indication information may indicate whether or not a prediction block is coded in the skip mode. The prediction block may mean a basic unit of a block which performs intra-prediction or inter-prediction. The skip indication information can be obtained for each prediction block. The skip indication information can be restrictively acquired in consideration of the slice type of the current prediction block. For example, I slice is decoded using intra-prediction only, and thus the skip mode is not used for I slice. Accordingly, the skip indication information can be obtained only when the slice type of the current prediction block does not correspond to I slice. A description will be given of a method for obtaining motion information of the current prediction information when the current prediction block is coded in the skip mode.

When the skip indication information of the current prediction block indicates that the current prediction block is coded in the skip mode, the motion information acquisition unit 710 can derive the motion information of the current prediction block using motion information of a neighboring block. The neighboring block may be a block adjoining the current prediction block.

For example, if a neighboring block adjoining the left side of the current prediction block is referred to as neighboring block A, a neighboring block adjoining the upper side of the current prediction block is referred to as neighboring block B, a neighboring block adjoining the upper-right side of the current prediction block is referred to as neighboring block C, and motion vectors of neighboring block A, neighboring block B and neighboring block C are respectively referred to as mvA, mvB and mvC, a motion vector predictor of the current prediction block can be acquired as the median of horizontal and vertical components of motion vectors mvA, mvB and mvC. The motion vector predictor of the current prediction block can be used as a motion vector of the current prediction block.

When the skip indication information of the current prediction block indicates that the current prediction block is coded in the skip mode, the motion information acquisition unit 710 may acquire the motion information of the current prediction block using motion vector competition. The motion vector competition can be adaptively used using motion vector competition indication information. The motion vector competition indication information may indicate whether or not motion vector competition is used. The motion vector competition indication information can be obtained on a slice basis or a prediction block basis.

For example, when the motion competition indication information indicates that motion vector competition is used, a motion vector predictor can be obtained using motion vector competition. Conversely, when the motion competition indication information indicates that motion vector competition is not used, a motion vector predictor can be obtained from a motion vector of a neighboring block, as described above.

Motion vector competition is a method of obtaining the motion vector predictor of the current prediction block in consideration of a motion vector of a temporal neighboring block as well as a motion vector of a spatial neighboring block. For example, the spatial neighboring block can be a neighboring block adjoining the current prediction block. The spatial neighboring block may include blocks respectively adjoining the left side, upper side and upper-right side of the current prediction block. The temporal neighboring block is a block in a reference picture and may correspond to a block in the same position as the current prediction block. The method of obtaining the motion vector predictor of the current prediction block will now be described in detail with reference to FIG. 3.

Figure 3:
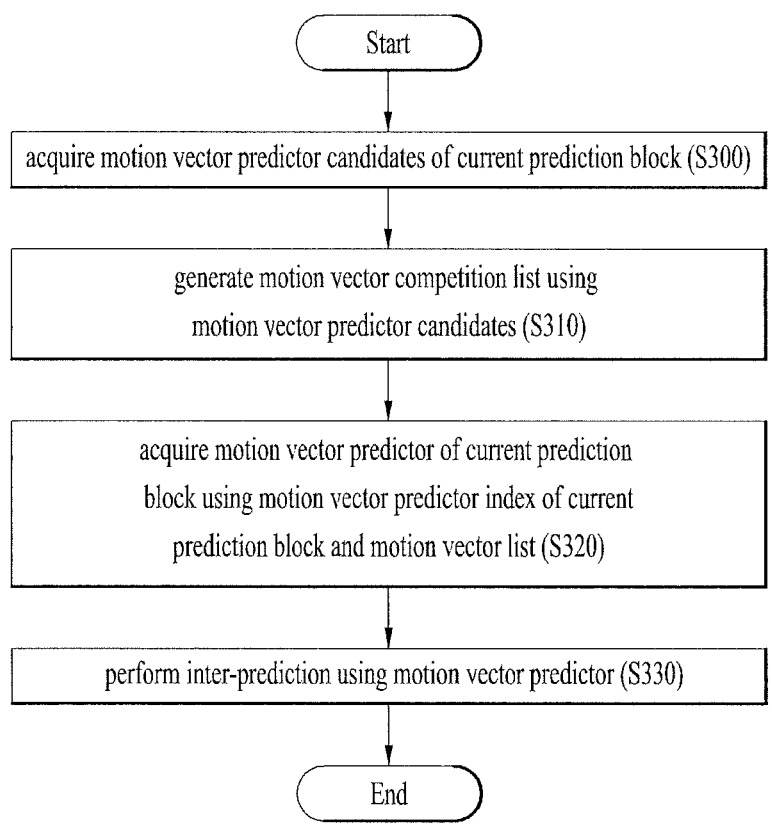
FIG. 3 is a flowchart illustrating a method for obtaining a motion vector predictor of a current prediction block using motion vector competition according to an embodiment of the present invention.

FIG. 3 is a flowchart illustrating a method for obtaining the motion vector prediction value of the current predicted block using motion vector competition according to an embodiment of the present invention.

Referring to FIG. 3, the motion information acquisition unit 710 may acquire motion vector predictor candidates of the current prediction block (S300). The motion vector predictor candidates may use motion vectors of spatial neighboring blocks of the current prediction block. For example, motion vectors of neighboring blocks adjoining the left side, upper side and upper-right side of the current prediction block can be used as the motion vector predictor candidates. The median of horizontal and vertical components of the motion vectors of the spatial neighboring blocks of the current prediction block can belong to the motion vector predictor candidates.

Furthermore, a motion vector of a temporal neighboring block may also belong to the motion vector predictor candidates. The motion vector of the temporal neighboring block may be adaptively used as a motion vector predictor candidate. To achieve this, temporal competition information can be used. The temporal competition information may indicate whether the motion vector of the temporal neighboring block is used for motion vector competition. That is, the temporal competition information can indicate whether the motion vector of the temporal neighboring block is included in the motion vector predictor candidates. Accordingly, when the motion vector predictor of the current prediction block is acquired using motion vector competition, use of the motion vector of the temporal neighboring block as a motion vector predictor candidate can be restricted according to the temporal competition information. Since the temporal competition information is based on the premise that motion vector competition is used, the temporal competition information may be acquired only when the motion competition indication information indicates that motion vector competition is used.

The motion information acquisition unit 710 may generate a motion vector competition list using the motion vector predictor candidates (S310). The motion vector predictor candidates may be aligned in a specific order. For example, the motion vector predictor candidates can be aligned in the order of the median acquired from the motion vectors of the spatial neighboring blocks of the current prediction block and the motion vectors of the spatial neighboring blocks. Furthermore, the motion vectors of the spatial neighboring blocks may be aligned in the order of the motion vectors of the neighboring blocks adjoining the left side, upper side and upper-right side of the current prediction block. When the motion vector of the temporal neighboring block is used as a motion vector predictor candidate according to the temporal competition information, the motion vector of the temporal neighboring block may be added as the last candidate to the motion vector competition list. The motion vector predictor candidates in the motion vector competition list may be specified by index information. That is, the motion vector competition list can be composed of the motion vector predictor candidates and index information allocated to the motion vector predictor candidates.

The motion vector acquisition unit 710 may acquire the motion vector predictor of the current prediction block using the index information of the motion vector predictor candidates and the motion vector competition list (S320). The index information of the motion vector predictor candidates may mean information that specifies the motion vector predictor candidates in the motion vector competition list. The index information of the motion vector predictor candidates may be obtained for each prediction block.

Inter-prediction may be performed on the current prediction block using the acquired motion vector predictor (S330). In this case, the motion vector predictor can be used as a motion vector of the current prediction block. The inter-prediction procedure using the motion vector predictor will be described in detail below.

A description will be given of a method for obtaining the motion information of the current prediction block when the current prediction block is not coded in the skip mode.

The motion information of the current prediction block may be obtained using a block merger. The block merger may merge the current prediction block and neighboring blocks. The neighboring blocks may include neighboring blocks adjoining the left side and upper side of the current prediction block. The embodiment is described on the assumption that the blocks adjoining the left side and upper side of the current prediction block are available. The current prediction block may be merged with at least one of the neighboring block adjoining the left side of the current prediction block and the neighboring block adjoining the upper side of the current prediction block.

When the motion information of the current prediction block is acquired using the block merger, the motion information of the current prediction block can be derived from motion information of a neighboring block merged with the current prediction block, which will now be described in detail with reference to FIG. 4.

Figure 4:
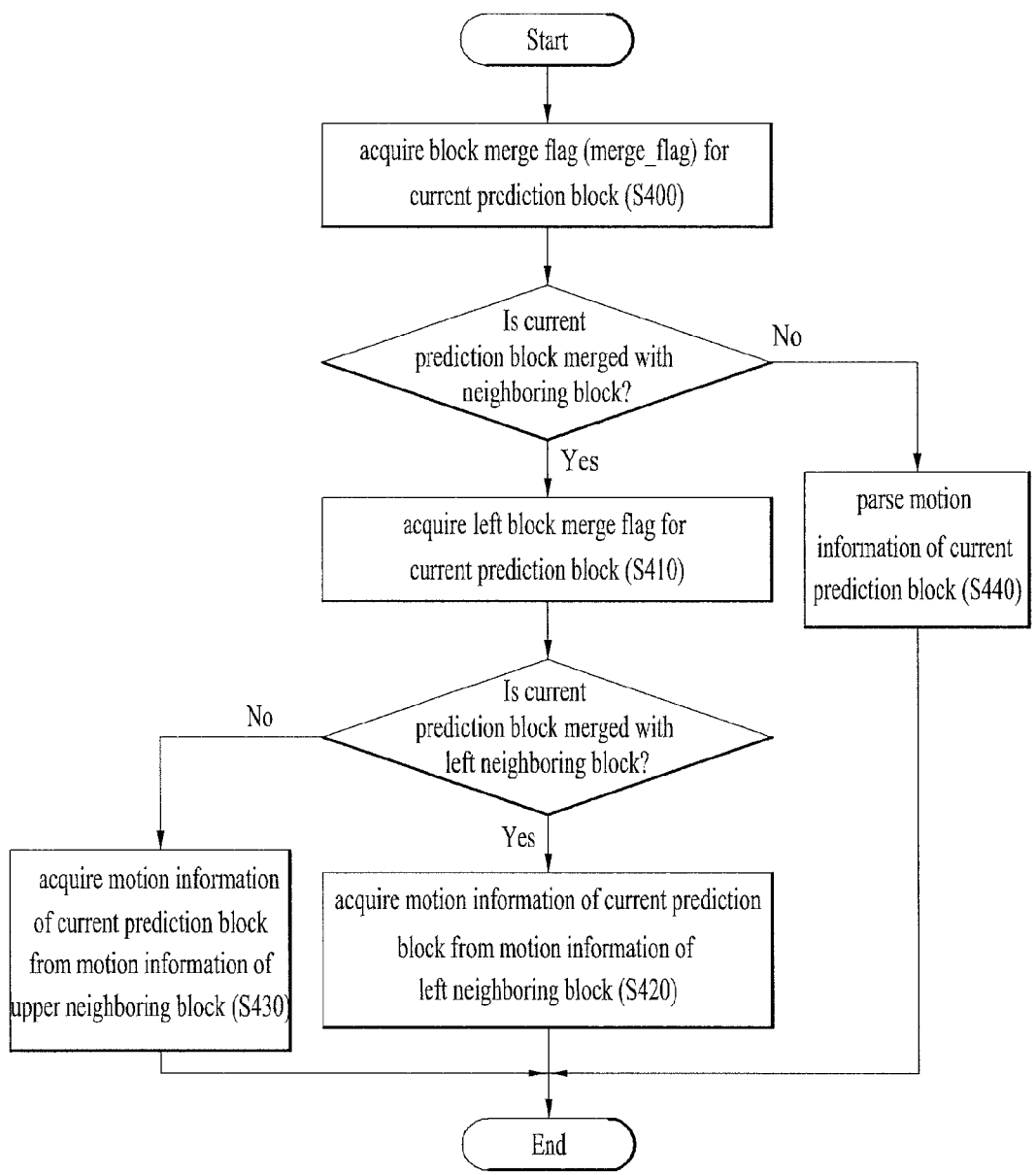
FIG. 4 is a flowchart illustrating a method for obtaining motion information of the current prediction block using a block merger according to an embodiment of the present invention.

FIG. 4 is a flowchart illustrating a method for obtaining the motion information of the current prediction block using the block merger according to an embodiment of the present invention.

Referring to FIG. 4, the motion information acquisition unit 710 may acquire a block merge flag of the current prediction block (S400). The block merge flag is information that indicates whether the motion information of the current prediction block is derived using a block merger. The block merge flag may be information that indicates whether the motion information of the current prediction block is derived from motion information of a neighboring block merged with the current prediction block. The motion information may include a motion vector and a reference picture index.

The neighboring block that can be merged with the current prediction block may be a neighboring block (referred to as a left neighboring block hereinafter) adjoining the left side of the current prediction block or a neighboring block (referred to as an upper neighboring block hereinafter) adjoining the upper side of the current prediction block. In this case, if motion information of the left neighboring block is equal to motion information of the upper neighboring block, it is not necessary to indicate whether the current prediction block is merged with the left neighboring block or the upper neighboring block. Accordingly, the current prediction block can be merged with the left and upper neighboring blocks. If the motion information of the left neighboring block is different from the motion information of the upper neighboring block, it is necessary to indicate whether the current prediction block is merged with the left neighboring block or the upper neighboring block. To achieve this, a left block merge flag is defined. The left block merge flag may be information that indicates whether the current prediction block is merged with the left neighboring block or the upper neighboring block or information that indicates whether the motion information of the current prediction block is derived from the motion information of the left neighboring block or the motion information of the upper neighboring block.

The motion information acquisition unit 710 can obtain the left block merge flag when the block merge flag indicates that the motion information of the current prediction block is derived using the block merger (S410). As described above, it is possible to determine whether the motion information of the left neighboring block is equal to the motion information of the upper neighboring block and to obtain the left block merge flag only when the motion information of the left neighboring block is not equal to the motion information of the upper neighboring block. If the motion information of the left neighboring block is different from the motion information of the upper neighboring block, the current prediction block can be merged with one of the left and upper neighboring blocks. Accordingly, it is possible to consider that a plurality of neighboring block candidates which can be merged with the current prediction block are present.

The motion information acquisition unit 710 can acquire the motion information of the current prediction block from the motion information of the left neighboring block when the current prediction block is merged with the left neighboring block according to the left block merge flag (S420) and can acquire the motion information of the current prediction block from the motion information of the upper neighboring block when the current prediction block is merged with the upper neighboring block (S430). For example, the motion information of the merged neighboring block can be used as the motion information of the current prediction block. In this case, it is possible to reduce the number of transmitted bits because the motion information of the current prediction block for inter-prediction is derived from the motion information of the neighboring block without being coded.

When the motion information of the current prediction block is not derived using the block merger according to the block merge flag, the motion information acquisition unit 710 can parse the differential motion vector and reference picture index of the current prediction block for inter-prediction (S440).

The differential motion vector and the reference picture index can be obtained in consideration of the slice type of the current prediction block. When the slice type of the current prediction block corresponds to B slice, forward direction prediction, backward direction prediction and bi-prediction can be used for inter-prediction. In this case, the differential motion vector and the reference picture index can be efficiently obtained using information (referred to as inter-prediction identification information) which indicates which one of forward direction prediction, backward direction prediction and bi-prediction is used for inter-prediction of a prediction block.

For example, when the inter-prediction identification information corresponds to forward direction prediction, a differential motion vector and a reference picture index used for forward direction prediction is obtained whereas a differential motion vector and a reference picture index used for backward direction prediction is not acquired. When the inter-prediction identification information corresponds to backward direction prediction, the differential motion vector and the reference picture index used for forward direction prediction is not obtained whereas the differential motion vector and the reference picture index used for backward direction prediction is acquired. When the inter-prediction identification information corresponds to bi-prediction, two differential motion vectors and two reference picture indexes used for bi-prediction can be obtained.

When the slice type of the current prediction block is P slice, only forward direction prediction can be used for inter-prediction. Accordingly, the inter-prediction identification information can be set to forward direction prediction when the slice type of the current prediction block is P slice.

Hence, the inter-prediction identification information may be parsed only when the slice type of the current prediction block is B slice. When the slice type of the current prediction block is P slice, only the differential motion vector and the reference picture index used for forward direction prediction can be obtained even if the inter-prediction identification information is not parsed because the inter-prediction identification information is set to forward direction prediction.

When the motion information of the current prediction block is not derived using the block merger, the motion vector predictor of the current prediction block may be acquired using motion information of neighboring blocks. For example, if a block adjoining the left side of the current prediction block is neighboring block A, a block adjoining the upper side of the current prediction block is neighboring block B, a block adjoining the upper-right side of the current prediction block is neighboring block C, and motion vectors of neighboring blocks A, B and C are mvA, mvB and mvC, respectively, the motion vector predictor of the current prediction block can be acquired as the median of horizontal and vertical components of the motion vectors mvA, mvB and mvC.

Otherwise, the motion vector predictor may be obtained using the aforementioned motion vector competition. Detailed description of acquisition of the motion vector predictor using motion vector competition is omitted.

The motion vector of the current prediction block can be obtained by summing the parsed differential motion vector and the motion vector predictor derived in the decoder.

The current prediction block may be divided into a plurality of partitions in order to improve inter-prediction accuracy and the motion information of the current prediction block may be acquired for each partition of the current prediction block.

When the current prediction block is not coded in the skip mode, the current prediction block may be coded in a direction prediction mode. The direct prediction mode corresponds to a mode in which the motion information of the current prediction block is predicted from motion information of a decoded block. The direct prediction mode is distinguished from the skip mode in that the current prediction block has a residual in the direct prediction mode.

The motion vector of the current prediction block may be derived using the same method as that used in the skip mode. For example, the motion vector of the current prediction block can be acquired as the median of horizontal and vertical components of a motion vector of a neighboring block. The neighboring blocks may be a block adjoining the current prediction block. The neighboring block may include left side, upper side and upper-right side neighboring blocks of the current prediction block. The motion vector of the current prediction block may be obtained using motion vector competition. That is, the motion vector of the current prediction block may be obtained using index information of motion vector predictor candidates and a motion vector competition list.

The index information of the motion vector predictor candidates may be obtained in consideration of the above-described inter-prediction identification information.

For example, when the slice type of the current prediction block corresponds to B slice, the current prediction block can be predicted through forward direction prediction, backward direction prediction and bi-prediction. In this case, it is possible to selectively obtain the index information of the motion vector predictor candidates for a case in which forward direction prediction is used for the current prediction block, a case in which backward direction prediction is used for the current prediction block, and a case in which bi-direction prediction is used for the current prediction block, using the inter-prediction identification information.

Accordingly, when the inter-prediction identification information corresponds to forward direction prediction, index information of a motion vector predictor candidate used for forward direction prediction may be obtained and index information of a motion vector predictor candidate used for backward direction prediction may not be obtained. When the inter-prediction identification information corresponds to backward direction prediction, the index information of the motion vector predictor candidate used for forward direction prediction may not be obtained and the index information of the motion vector predictor candidate used for backward direction prediction may be acquired. When the inter-prediction identification information represents bi-direction prediction, index information of two motion vector predictor candidates used for bi-direction prediction may be obtained.

When the slice type of the current prediction block is P slice, only forward direction prediction is used for inter-prediction, and thus the inter-prediction identification information can be set to forward direction prediction. Accordingly, the inter-prediction identification information can be parsed only when the slice type of the current prediction block is B slice. When the slice type of the current prediction block is P slice, only the index information of the motion vector predictor candidate used for forward direction prediction can be obtained even if the inter-prediction identification information is not parsed because the inter-prediction identification information is set to forward direction prediction.

The reference block acquisition unit 720 may acquire a reference block of the current prediction block using the motion information, that is, the motion vector and reference picture index, obtained by the motion information acquisition unit 710. The reference block is present in a reference picture having the reference picture index. The pixel value of the block specified by the motion vector can be used as the predictor of the current prediction block. That is, motion compensation that estimates a motion from a previously decoded picture to predict the current block is used.

The reference block acquisition unit 720 may use a motion vector having pixel resolution (referred to as decimal pixel resolution hereinafter) of less than an integer number of pixels when performing motion compensation. For example, ½ pixel resolution, ¼ pixel resolution, and ⅛ pixel resolution can be used. As pixel resolution used for motion compensation increases, motion compensation performance is improved.

If a motion vector having decimal pixel resolution is used for motion compensation, a signal having decimal pixel resolution may be generated through interpolation of pixel values of the reference picture. In this case, an interpolation filter can be used. The interpolation filter may multiply input signals applied thereto by filter coefficients for every pixel and output the sum of multiplication results. The input signals of the interpolation filter may include integer pixels of the reference picture and/or previously generated signals having decimal pixel resolution.

The interpolation filter may be used in the vertical direction, horizontal direction or diagonal direction in consideration of position information of a signal having decimal pixel resolution. The position information of the signal having decimal pixel resolution may be represented by a difference between the position of an integer pixel and the position of the signal having decimal pixel resolution. For example, when the signal having decimal pixel resolution is located between integer pixels arranged in the horizontal direction, the signal having decimal pixel resolution can be generated through interpolation of the integer pixels arranged in the horizontal direction and/or signals having decimal pixel resolution. That is, the interpolation filter can be applied in the horizontal direction. The number of input signals of the interpolation filter, that is, the number of integer pixels arranged in the horizontal direction and/or signals having decimal pixel resolution may equal the number of filter coefficients of the interpolation filter.

When the signal having decimal pixel resolution is located between integer pixels arranged in the vertical direction, the signal having decimal pixel resolution can be generated through interpolation of the integer pixels arranged in the vertical direction and/or previously generated signals having decimal pixel resolution. That is, the interpolation filter can be applied in the vertical direction. The previously generated signals having decimal pixel resolution may have a resolution lower than that of the signals having decimal pixel resolution or may have a resolution corresponding to that of the signals having decimal pixel resolution.

The number of input signals of the interpolation filter, that is, the number of integer pixels adjacent to the signals having decimal pixel resolution and/or the signals having decimal pixel resolution may equal the number of filter coefficients of the interpolation filter.

The interpolation filter may be specified by interpolation filter identification information. It is possible to adaptively use a filter that minimizes an inter-prediction error by using the interpolation filter identification information, resulting in a reduction in the quantity of residual data and improvement of coding performance. The interpolation filter identification information may indicate the type or filter coefficient of the interpolation filter. Accordingly, the interpolation filer used to generate signals having decimal pixel resolution can be specified using the interpolation filter identification information. The interpolation filter identification information may be obtained at a sequence level, picture level or slice level and the same interpolation filter may be used for sequences, pictures or slices (an embodiment of a filter may be added).

The pixel values of the reference block may be used as the predictor of the current prediction block after weight information is applied to the pixel values. A method for obtaining the weight information and a method for applying the weight information will now be described.

Slice types include I slice, P slice and B slice. When the current slice is P slice, the current slice is decoded using intra-prediction or inter-prediction, and one motion vector and reference pixel index may be used for inter-prediction. Accordingly, when the current slice is P slice, the current prediction block in the current slice can use the pixel values of the reference block as the predictor thereof. Here, the pixel values of the reference block may correspond to restored pixel values of a reference block indicated by the aforementioned one motion vector in the reference picture having the aforementioned one reference picture index. When the current slice is B slice, the current slice is decoded using inter-prediction as well as intra-prediction and at most two motion vectors and reference picture indexes can be used for inter-prediction. B slice may be regarded as bi-prediction slice. If inter-prediction is performed for a prediction block in B slice using one motion vector and one reference picture index, the above method described for P slice can be applied in the same manner. When inter-prediction is performed for the current prediction block in B slice using two motion vectors and two reference picture indexes, the mean value of pixel values of two reference blocks obtained by the two motion vectors and two reference picture indexes can be used as the predictor of the current prediction block.

An adaptive weight instead of a fixed weight, that is, (½,½), may be applied to the pixel values of the two reference blocks.

Referring to the following table 1, Table 1 is stored in an encoder and a decoder and may include weight coefficient information and index information corresponding to the weight coefficient information. For example, (1,0), (⅔,⅓), (½,½), (½,⅔) and (0,1) can be used as weights. However, weights are not limited thereto. The encoder may select a weight coefficient which minimizes residual data of the current prediction block from weight coefficients shown in Table 1 and transmit index information corresponding to the selected weight coefficient to the decoder. The residual data may represent a difference between the pixel values of the current prediction block and the predictor of the current prediction block. The decoder may obtain the predictor of the current prediction block by applying the weight coefficient corresponding to the index information transmitted from the encoder to the pixel values of the reference block. The index information may be transmitted on a slice basis or a prediction block basis.

TABLE 1

| index | weighting coefficients |
| --- | --- |
| 0 | 1, 0 |
| 1 | ⅔, ⅓ |
| 2 | ½, ½ |
| 3 | ⅓, ⅔ |
| 4 | 0, 1 |

Alternatively, the encoder may directly extract weight coefficients which minimize the residual data of the current prediction block and generate a weight list. The weight coefficients may be respectively assigned indexes. In this case, the weight list may include the indexes. The encoder may transmit indexes corresponding to weight coefficients applied to the current prediction block to the decoder. The indexes may be transmitted for the slice including the current prediction block or for each prediction block. The decoder can obtain the predictor of the current prediction block by applying specific weight coefficients to the pixel values of the reference block according to the received weight list and the indexes.

A description will be given of a method for deriving a weight using a template region with reference to FIG. 5.

Figure 5:
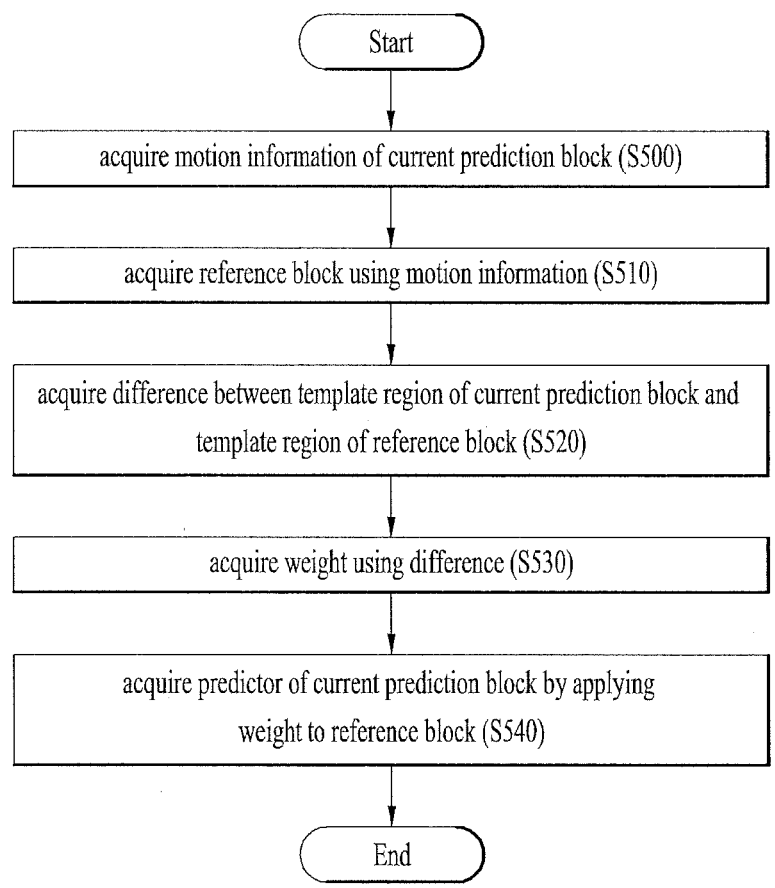
FIG. 5 is a flowchart illustrating a method for obtaining a weight using a template region of the current prediction block and a template region of a reference block according to an embodiment of the present invention.

FIG. 5 is a flowchart illustrating a method for obtaining a weight using a template region of the current prediction block and a template region of a reference block according to an embodiment of the present invention.

The motion information acquisition unit 710 may obtain motion information of the current prediction block (S500). The motion information can be obtained using the same method as the above-mentioned method for obtaining motion information. The motion information may be acquired in consideration of slice type. For example, when it is checked that the slice to which the current prediction block belongs corresponds to P slice, one motion vector and reference picture index can be obtained. When the current prediction block belongs to B slice, a maximum of two motion vectors and two reference picture indexes can be obtained. The following description is based on a case in which the slice type of the current prediction block is B slice.

The reference block acquisition unit 720 may acquire a reference block using the motion information of the current prediction block (S510). The reference block may be a block which is referred to for inter-prediction of the current prediction block. In other words, the reference block may be a block which is indicated by the motion vector of the current prediction block in the reference picture having the reference picture index of the current prediction block. The reference block may be a block that has been decoded before the current prediction block is decoded. When the slice type of the current prediction block is B slice, a maximum of two reference blocks can be obtained. Pixel values of the two reference blocks may be used as the predictor of the current prediction block. Before being used as the predictor of the current prediction bloc, the pixel values of the two reference blocks may be assigned a weight. A method for obtaining the weight will now be described.

The weight application unit 730 may obtain a difference between a template region of the current prediction block and a template region of the reference block (S520). This is described with reference to FIG. 6.

Figure 6:
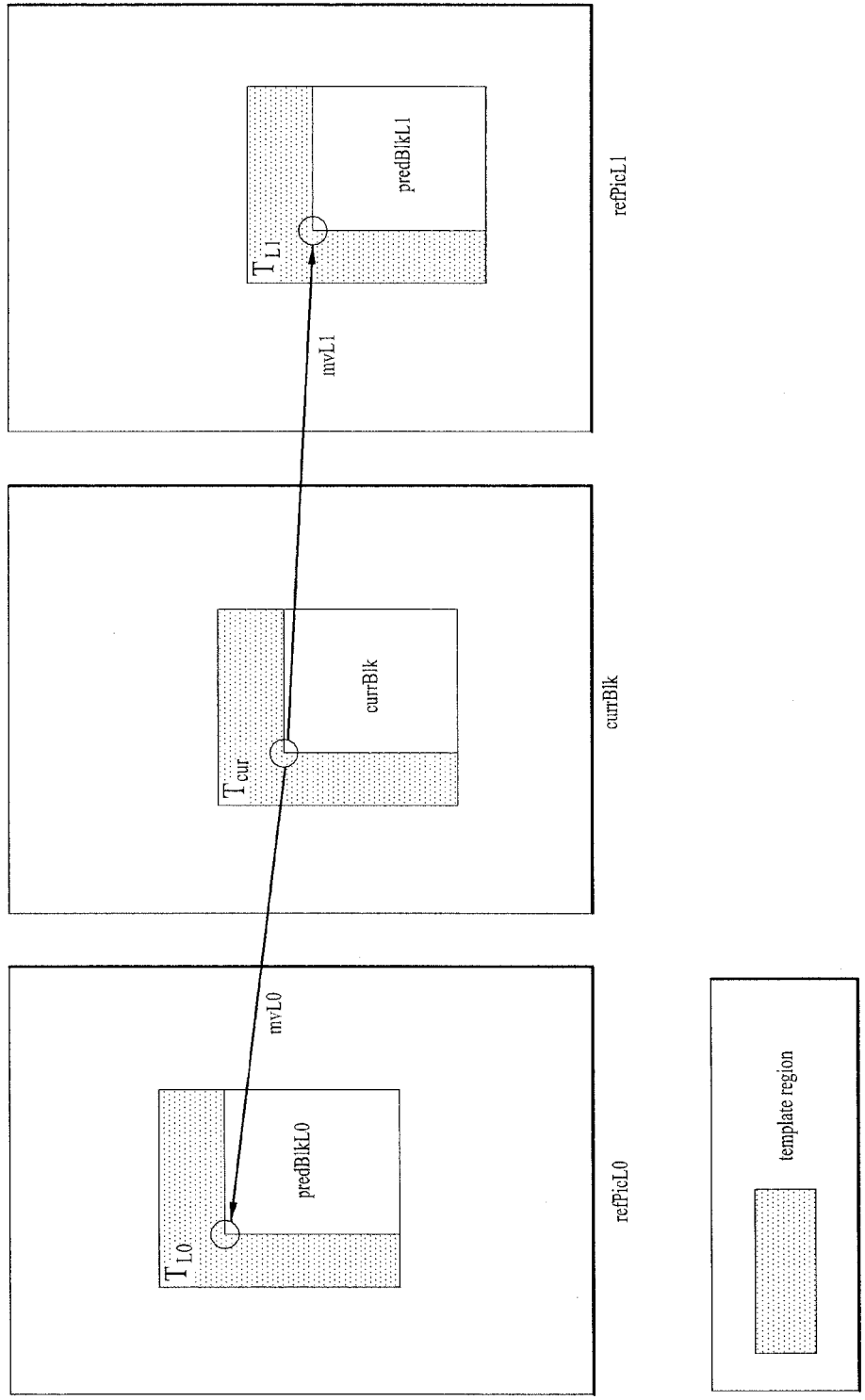
FIG. 6 shows a template region of the current prediction block and a template region of a reference block according to an embodiment of the present invention.

FIG. 6 shows the template region of the current prediction block and the template region of the reference block according to an embodiment of the present invention.

The template region of the current prediction block may mean a neighboring block adjoining the current prediction block. The template region of the current prediction block may be a block that has been decoded before the current prediction block is decoded. The template region of the reference block may mean a neighboring block adjoining the reference block and may be a block that has been decoded before the reference block is decoded. Referring to FIG. 6, the template region may include neighboring blocks adjoining the left side, upper side and upper left corner of the current prediction block (or reference block). However, the neighboring blocks may be restrictively used according to the position of the current prediction block (or reference block). For example, when the current prediction block (or reference block) is located on the left of the current picture (or reference picture), use of the neighboring block adjoining the left side of the current prediction block (or reference block) may be restricted. When the current prediction block (or reference block) is located at the top of the current picture (or reference picture), use of the neighboring block adjoining the upper side or upper left corner of the current prediction block (or reference block) may be restricted. Accordingly, the weight application unit 730 may check whether the neighboring blocks can be used before weights are obtained, and then specify the neighboring blocks as the template region when the neighboring blocks can be used.

Referring to FIG. 6, two reference blocks can be obtained using two pieces of motion information of the current prediction block and templates regions for the two reference blocks can be respectively specified. Hereinafter, the two reference blocks are referred to as a first reference block and a second reference block. The weight application unit 730 can obtain a difference D0 between the template region Tc of the current prediction block and the template region T0 of the first reference block and a difference D1 between the template region Tc of the current prediction block and the template region T1 of the second reference block. For example, the difference D0 can correspond to a difference between the sum of pixel values included in the template region Tc of the current prediction block and the sum of pixel values included in the template region T0 of the first reference block. Otherwise, the difference D0 may correspond to a difference between the mean of the pixel values included in the template region Tc of the current prediction block and the mean of the pixel values included in the template region T0 of the first reference block. However, the different D0 is not limited thereto. The difference D1 can be obtained through the same method as that used to acquire the difference D0.

The weight application unit 730 can obtain weights using the differences D0 and D1 (S530). For example, the weights can be obtained according to the ratio of the difference D1 to the difference D1. If the different D0 is smaller than difference D1, the first reference block can be regarded as a reference block more similar to the current prediction block than the second reference block. Conversely, if the different D1 is smaller than difference D0, the second reference block can be regarded as a reference block more similar to the current prediction block than the first reference block. Accordingly, the weights can be obtained according to Equation 1.

$$W0=D1/(D0+D1), W1=D0/(D0+D1) \quad \text{[Equation 1]}$$

In Equation 1, W0 denotes a weight applied to the first reference block and W1 denotes a weight applied to the second reference block.

The weight application unit 730 may obtain the predictor of the current prediction block by respectively applying the weights W0 and W1 to the first reference block and the second reference block (S540). For example, the predictor of the current prediction block can be acquired according to Equation 2.

$$predblk[x,y]=W0*predblk0[x,y]+W1*predblk1[x,y] \quad \text{[Equation 2]}$$

In Equation 2, pedblk[x,y] denotes the predictor of the current prediction block, predblk0[x,y] denotes a pixel value of the first reference block and predblk1 [x,y] represents a pixel value of the second reference block.

Figure 7:
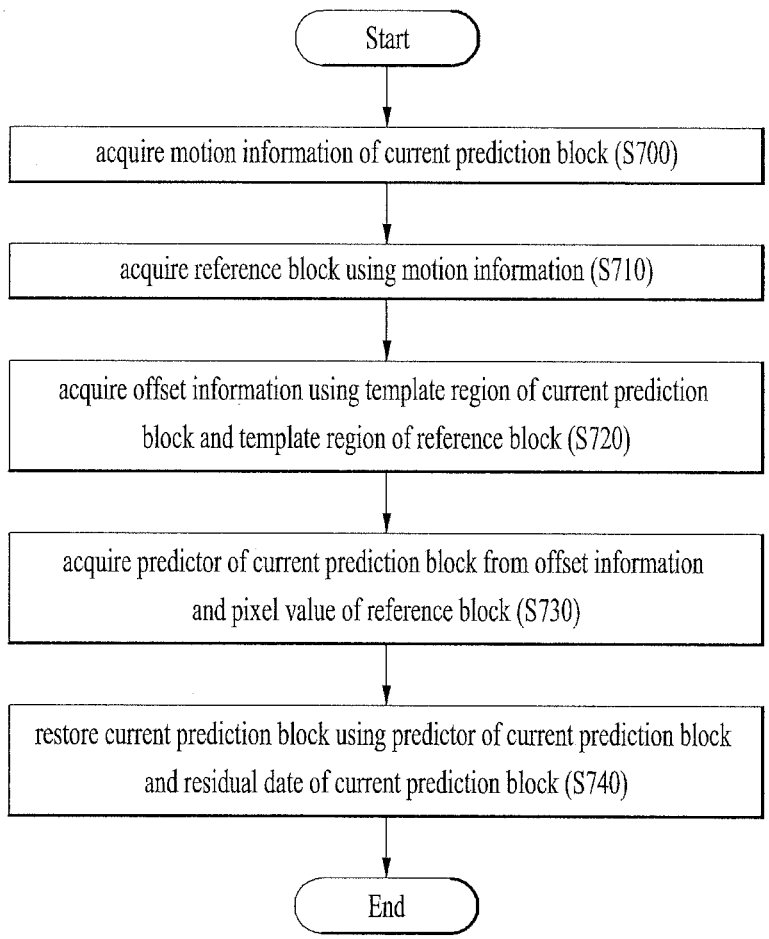
FIG. 7 is a flowchart illustrating a method for obtaining a predictor of the current prediction block through illumination compensation based on a template region according to an embodiment of the present invention.

FIG. 7 is a flowchart illustrating a method for obtaining the predictor of the current prediction block through illumination compensation based on a template region according to an embodiment of the present invention.

It is possible to reduce a residual of the current prediction block and to improve video coding efficiency by compensating for an illumination difference between the current picture and a reference picture. Illumination compensation may be performed using a template region. The template region has been described above.

Referring to FIG. 7, the motion information acquisition unit 710 may obtain motion information of the current prediction block (S700). The motion information can be obtained using the same method as the above-mentioned method for obtaining motion information. The motion information may be acquired in consideration of slice type. For example, when it is checked that the slice to which the current prediction block belongs corresponds to P slice, one motion vector and reference picture index can be obtained. When the current prediction block belongs to B slice, a maximum of two motion vectors and two reference picture indexes can be obtained.

The reference block acquisition unit 720 may acquire a reference block using the motion information of the current prediction block (S710). The reference block may be a block which is referred to for inter-prediction of the current prediction block. In other words, the reference block may mean a block which is indicated by the motion vector of the current prediction block in the reference picture having the reference picture index of the current prediction block. The reference block may be a block that has been decoded before the current prediction block is decoded. The pixel values of the reference block may be used as the predictor of the current prediction block. Before the pixel values of the reference block are used as the predictor of the current prediction block, first offset information may be applied to the pixel values of the reference block. A method for obtaining the first offset information will now be described.

The weight application unit 730 may obtain offset information using the template region of the current prediction block and the template region of the reference block (S720). The offset information may be information that represents an illumination difference between the current prediction block and the reference block. A method for restoring the current prediction block using the offset information will now be described with reference to FIGS. 8 and 9.

Figure 8:
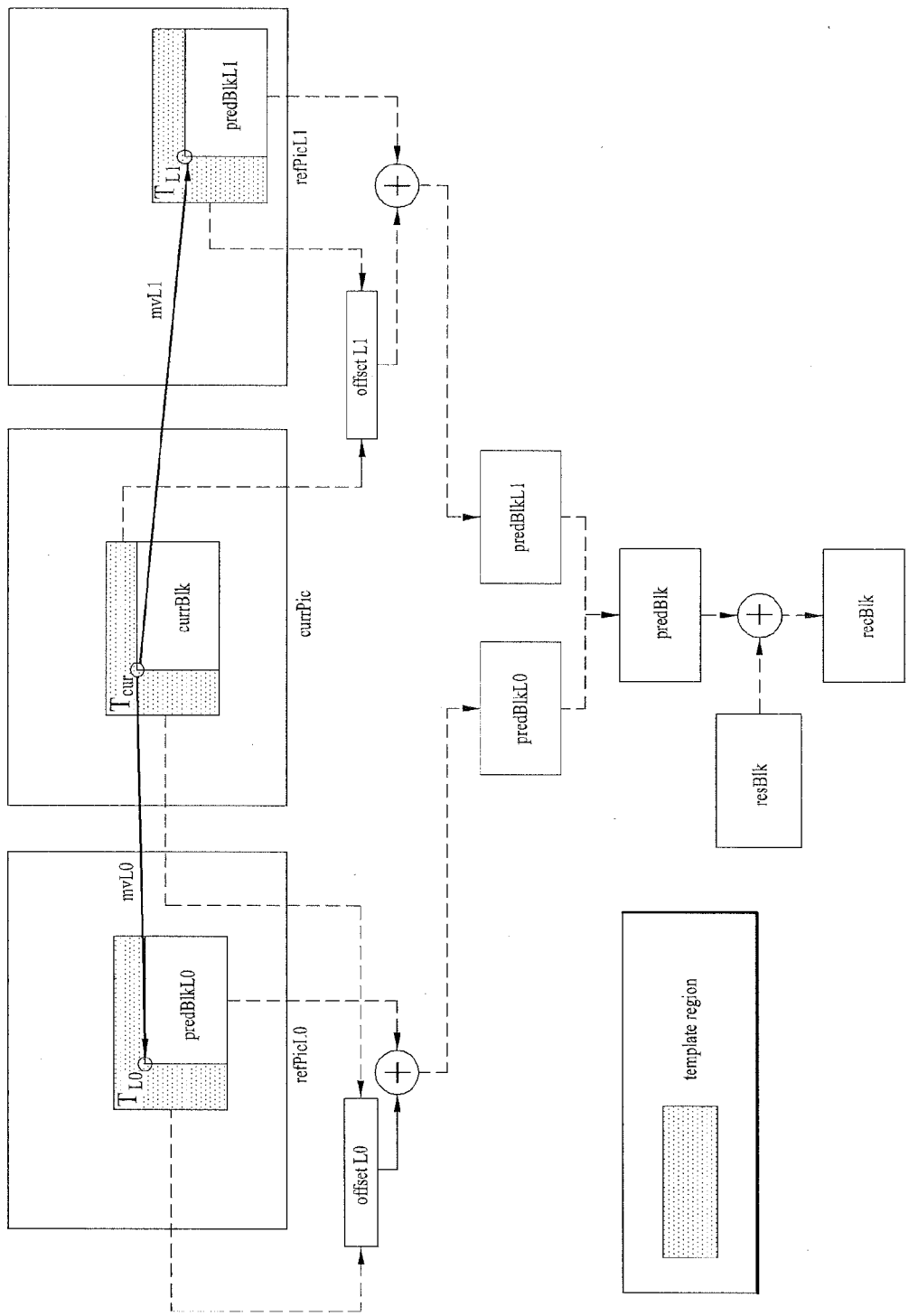
FIG. 8 illustrates a method for obtaining a predictor of the current prediction block using first offset information according to an embodiment of the present invention.

FIG. 8 illustrates a method for obtaining the predictor of the current prediction block using the first offset information according to an embodiment of the present invention.

Referring to FIG. 8, the first offset information may be a difference between the mean of pixel values included in the template region of the current prediction block and the mean of pixel values included in the template region of the reference block. When the slice type of the current prediction block corresponds to P slice, only one reference block is referred to for inter-prediction, and thus one piece of first offset information can be obtained. When the slice type of the current prediction block corresponds to B slice, the current prediction block can refer to a maximum of two reference blocks, and thus the first offset information can be obtained for each of first and second reference blocks.

Figure 9:
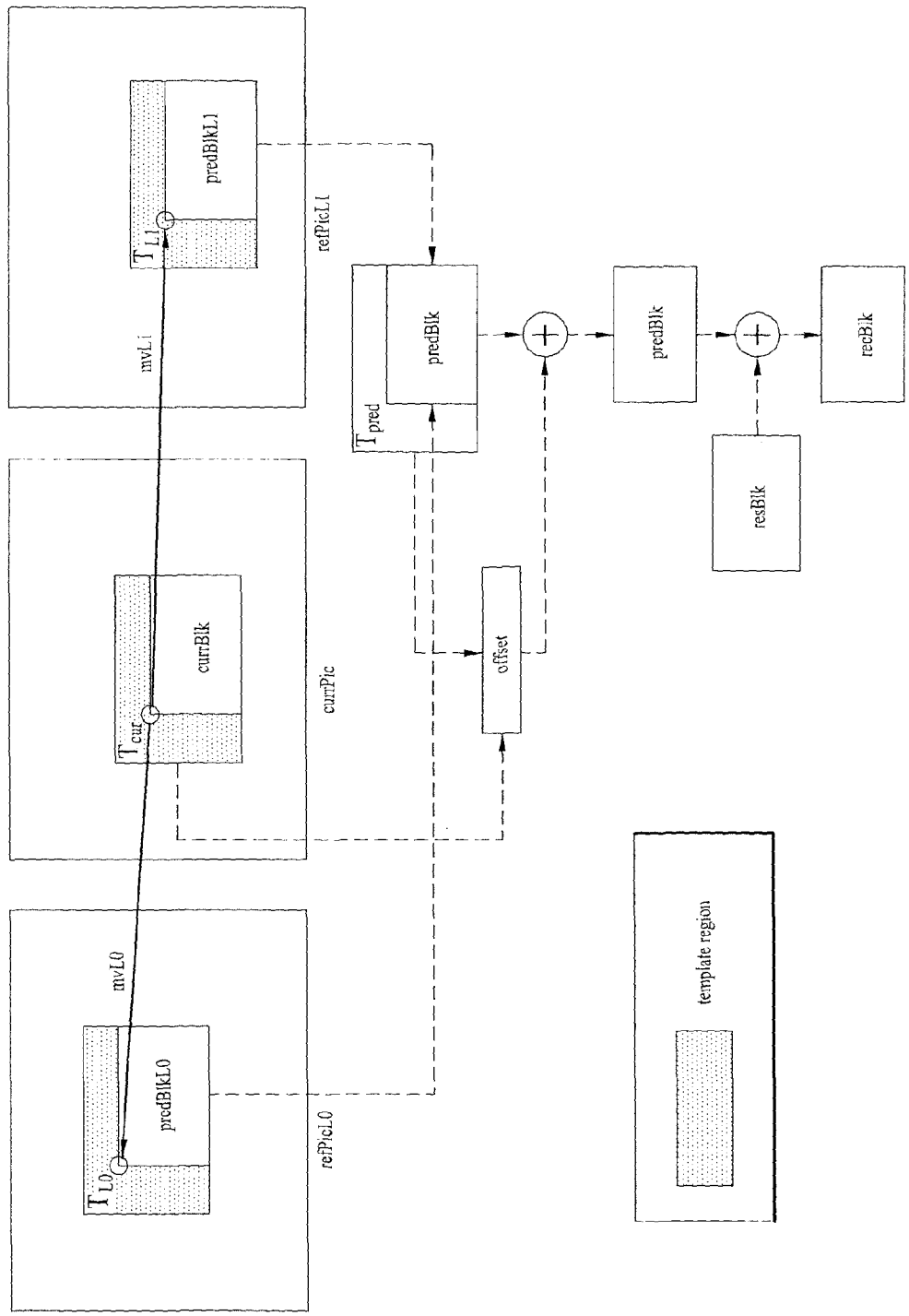
FIG. 9 illustrates a method for obtaining a predictor of the current prediction block using second offset information when the slice type of the current prediction block corresponds to B slice according to an embodiment of the present invention.

FIG. 9 illustrates a method for obtaining the predictor of the current prediction block using second offset information when the slice type of the current prediction block is B slice according to an embodiment of the present invention.

When the slice type of the current prediction block corresponds to B slice, a maximum of two reference blocks can be used for inter-prediction. When the current prediction block has two reference blocks, the two reference blocks are referred to as first and second reference blocks. In this case, weights may be applied to pixel values of a template region of the first reference block and pixel values of a template region of the second reference block, and then pixel values of template regions of weighted reference blocks may be obtained. The weights can be obtained through the above-described method of obtaining weights and as such a detailed explanation thereof is omitted.

Referring to FIG. 9, the second offset information may be a difference between a pixel value of the template region of the current prediction block and a pixel value of the template region of the weighted reference block. The pixel value of the template region of the current prediction block may mean at least one pixel values included in the template region of the current prediction block or the mean of the pixel values included in the template region.

The pixel value of the template region of the weighted reference block may mean at least one pixel value included in the template region of the weighted reference block or the mean of the pixel values included in the template region.

The weight application unit 730 may obtain the predictor of the current prediction block from the offset information and the pixel values of the reference block (S730).

A description will be given of a method for obtaining the predictor of the current prediction block with reference to FIG. 8.

Referring to FIG. 8, a pixel value of a modified reference block may be obtained using the first offset information and a pixel value of the reference block.

For example, the pixel value of the modified reference block can be obtained from the sum of the pixel value of the reference block and the first offset information about the reference block, which is represented as the following equation 3.

$$predblk'[x,y]=predblk[x,y]+offset \quad \text{[Equation 3]}$$

Here, predblk'[x,y] denotes the pixel value of the modified reference block, predblk[x,y] denotes the pixel value of the reference block, 'offset' represents the first offset information about the reference block. When the slice type of the current prediction block is B slice, the pixel value of the modified reference block can be obtained for each of the first and second reference blocks.

The predictor of the current prediction block can be acquired from the pixel value of the modified reference block. When the slice type of the current prediction block is P slice, the predictor of the current prediction block can be obtained from the pixel value of the modified reference block. When the slice type of the current prediction block is B slice, the predictor of the current prediction block can be obtained by applying weights to a pixel value of a modified first reference block and a pixel value of a modified second reference block. For example, the predictor of the current prediction block can correspond to the mean of the pixel values of the modified first and second reference blocks. The weights can be obtained by the aforementioned method for acquiring weights so that detailed explanation thereof is omitted.

A description will be given of a method for obtaining the predictor of the current prediction block with reference to FIG. 9. Referring to FIG. 9, when the slice type of the current prediction block is B slice, the first reference block and the second reference block can be used for inter-prediction. In this case, weights may be applied to the pixel values of the first reference block and the pixel values of the second reference block. Hereinafter, the pixel values are referred to as pixel values of weighted reference blocks. The weights can be obtained by the aforementioned method for acquiring weights. The predictor of the current prediction block can be obtained using the pixel values of the weighted reference blocks and the second offset information. For example, the predictor of the current prediction block can correspond to the sum of the pixel values of the weighted reference blocks and the second offset information.

The current prediction block may be restored using the predictor of the current prediction block and the residual of the current prediction block (S740). The residual of the current prediction block may be a difference between the pixel values of the current prediction block and the predictor of the current prediction block.

The predictor of the current prediction block can be obtained according to a combination of the method of obtaining a weight using a template region, illustrated in FIG. 5, and the illumination compensation method using a template region, illustrated in FIG. 7, which will be described with reference to FIG. 10.

Figure 10:
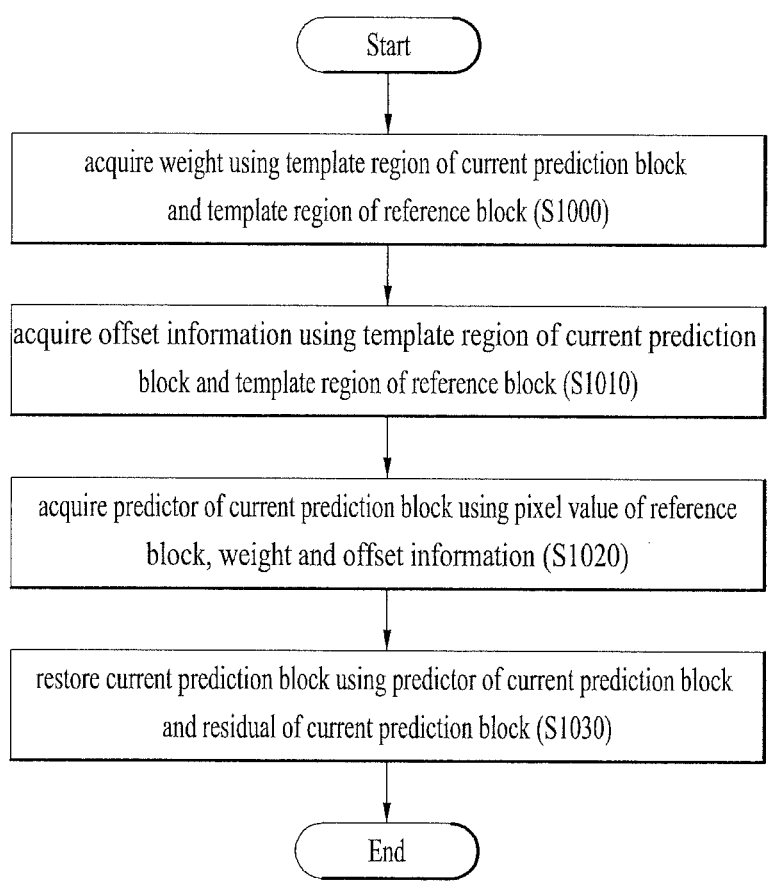
FIG. 10 illustrates a method for obtaining a predictor of the current prediction block on the basis of a weight and illumination compensation using a template region according to an embodiment of the present invention.

FIG. 10 illustrates a method for obtaining the predictor of the current prediction block on the basis of a weight and illumination compensation using a template region according to an embodiment of the present invention.

Referring to FIG. 10, the weight application unit 730 may obtain a weight using a template region of the current prediction block and a template region of a reference block (S1000). The method of obtaining a weight using a template region has been described with reference to FIG. 5, and thus detailed explanation thereof is omitted.

The weight application unit 730 may obtain offset information using the template region of the current prediction block and the template region of the reference block (S1010). The offset information may be a difference between a pixel value of the template region of the current prediction block and a pixel value of the template region of the reference block. Here, the mean of pixel values included in the template region of the current prediction block can be used as the pixel value of the template region of the current prediction block, and the mean of pixel values included in the template region of the reference block can be used as the pixel value of the template region of the reference block. When the slice type of the current prediction block is B slice, offset information may be obtained for each of first and second reference blocks. In this case, weights obtained using the template regions may be applied to the offset information. The offset information to which the weights have been applied is referred to as third offset information. The third offset information is represented as the following Equation 4.

$$\text{offset}X = WX * (Mc - MX) \qquad \text{[Equation 4]}$$

where, X=0 or 1.

In Equation 4, offsetX denotes third offset information offset0 about the first reference block or third offset information offset1 about the second reference block, WX denotes a weight applied to the pixel values of the first reference block or the second reference block, Mc represents the mean of the pixel values of the template region of the current prediction block, and MX represents the mean of the pixel values of the template region of each reference block.

The offset information may be obtained using the template region of the current prediction block and a template region of a weighted reference block. When the slice type of the current prediction block is B slice, template regions for the first reference block and the second reference block can be used. Hereinafter, the template regions for the first reference block and the second reference block are respectively referred to as a first template region and a second template region. The weights obtained using the above-mentioned template regions may be applied to pixel values of the first and second template regions so as to acquire template regions of weighted reference blocks. Here, the offset information can be obtained as a difference between the mean of the pixel values of the template region of the current prediction block and the mean of the pixel values of the template regions of the weighted reference blocks. The difference is referred to as fourth offset information. The fourth offset information is represented by the following equation 5.

$$\text{offset} = Mc - Mp \qquad \text{[Equation 5]}$$

where, $Mp = (W0*T0(i) + W1*T1(i))/N$

In equation 5, 'offset' denotes the fourth offset information, Mc denotes the mean of the pixel values of the template region of the current prediction block, and Mp denotes the mean of the pixel values of the template regions of the weighted reference block. In addition, W0 and W1 represent weights obtained using template regions, T0($i$) and T1($i$) represent pixel values of template regions of reference blocks, i denotes a pixel index, N denotes the number of pixels in a template region of a reference block.

The weight application unit 730 may obtain the predictor of the current prediction block using the pixel values of the reference blocks, the weights acquired using the template regions, and the offset information (S1020).

For example, when the third offset information is used, it is possible to compensate for an illumination difference between the current picture and the reference picture by applying the weights to the pixel values of the first and second reference blocks and adding the third offset information to the weighted pixel values of the first and second reference blocks. Accordingly, the pixel values of the current prediction block can be acquired according to the following equation 6.

$$predblk'[x,y]=(predblk0'[x,y]+offset0)+(predblk1'[x,y]+offset1)$$

$$predblkX'[x,y]=WX*predblkX[x,y] \quad \text{[Equation 6]}$$

where, X=0 or 1

In Equation 6, predblk'[x,y] denotes the predictor of the current prediction block, predblkX'[x,y] denotes a weighted pixel value of a reference block, offsetX represents the third offset information, WX represents a weight obtained using a template region, and predblkX[x,y] represents a pixel value of a reference block.

For example, when the fourth offset information is used, the weights are applied to the pixel values of the first and second reference blocks and the weighted pixel values are summed to obtain weighted pixel values of the reference blocks. It is possible to compensate for the illumination difference between the current picture and the reference picture by adding the fourth offset information to the weighted pixel values of the reference blocks. Accordingly, the pixel values of the current prediction block can be obtained according to the following equation 7.

$$predblk'[x,y]=predblk*[x,y]+offset$$

$$predblk*[x,y]=W0*predblk0[x,y]+W1*predblk1[x,y] \quad \text{[Equation 7]}$$

In Equation 7, predblk'[x,y] denotes the predictor of the current prediction block, predblk*[x,y] denotes a weighted pixel value of a reference block, and 'offset' denotes the fourth offset information. In addition, W0 and W1 represent weights obtained using template regions, and predblk0[x,y] and predblk1 [x,y] respectively represent the pixel values of the first and second reference blocks.

The current prediction block can be restored using the predictor of the current prediction block and the residual of the current prediction block (S1030). The residual of the current prediction block may be a difference between the pixel values of the current prediction block and the predictor of the current prediction block.

INDUSTRIAL APPLICABILITY

The present invention is applicable to video signal decoding.

The invention claimed is:

1. A method of decoding a video signal, the method comprising:
  obtaining motion information of a current prediction block of a current picture;
  obtaining at least two reference blocks from reference pictures of the current prediction block using the motion information of the current prediction block;
  obtaining first weight information using a difference between the current prediction block and a first reference block of the at least two reference blocks;
  obtaining a first offset value for the first reference block from a difference between an average of pixel values of a template region of the first reference block and an average of pixel values of a template region of the current prediction block, the template region of the first reference block being a region in at least one neighboring block adjacent to the first reference block, and the template region of the current prediction block being a region in at least one neighboring block adjacent to the current prediction block;
  obtaining second weight information using a difference between the current prediction block and a second reference block of the at least two reference blocks;
  obtaining a second offset value for the second reference block from a difference between an average of pixel values of a template region of the second reference block and the average of pixel values of the template region of the current prediction block, the template region of the second reference block being a region in at least one neighboring block adjacent to the second reference block;
  obtaining a prediction value of the current prediction block by applying the obtained first weight information to pixel values of the first reference block and the first offset value and applying the obtained second weight information to pixel values of the second reference block and the second offset value, wherein the prediction value of the current block is obtained from a sum of the weighted pixel values of the first reference block, the weighted first offset value, the weighted pixel values of the second reference block, and the weighted second offset value; and
  reconstructing the current prediction block using the prediction value of the current prediction block and a residual data of the current prediction block.

2. The method of claim 1, wherein the obtaining of the motion information of the current prediction block comprises:
  acquiring a block merge flag of the current prediction block; and
  acquiring the motion information of the current prediction block using motion information of a neighboring block when the block merge flag indicates that the motion information of the current prediction block is acquired using block merging,
  wherein the block merge flag corresponds to information that indicates whether the motion information of the current prediction block is derived using block merging, the block merging means merging of the current prediction block and the neighboring block, and the neighboring block includes a left neighboring block and an upper neighboring block of the current prediction block.

3. The method of claim 2, wherein the obtaining of the motion information of the current prediction block comprises:
  checking whether motion information of the left neighboring block is equal to motion information of the upper neighboring block; and
  acquiring a left block merge flag of the current prediction block when the motion information of the left neighboring block is not equal to the motion information of the upper neighboring block,
  wherein the left block merge flag indicates whether the current prediction block is merged with the left neighboring block or the upper neighboring block.

4. The method of claim 3, wherein the motion information of the current prediction block is obtained from the motion information of the left neighboring block when the left block merge flag indicates that the current prediction block is merged with the left neighboring block, and the motion information of the current prediction block is obtained from the motion information of the upper neighboring block when the left block merge flag indicates that the current prediction block is merged with the upper neighboring block.

5. The method of claim 1, wherein the motion information includes at least two motion vectors and at least two reference picture indices.

6. The method of claim 5, wherein when a motion vector having decimal pixel resolution corresponding to one of ½ pixel resolution, ¼ pixel resolution, or ⅛ pixel resolution, the obtaining of the at least two reference blocks from the reference pictures comprises generating a signal having decimal pixel resolution from a corresponding reference picture using an interpolation filter, wherein the interpolation filter multiplies an input signal thereof by filter coefficients for every pixel and outputs the sum of multiplication results.

7. The method of claim 6, wherein the input signal of the interpolation filter includes at least one of integer pixels of the corresponding reference picture and a previously generated signal having decimal pixel resolution.

8. The method of claim 6, wherein the interpolation filter is used in the vertical direction, horizontal direction or diagonal direction in consideration of position information on the signal having decimal pixel resolution, wherein the position information on the signal having decimal pixel resolution corresponds to a difference between the position of an integer pixel and the position of the signal having decimal pixel resolution.

9. The method of claim 6, wherein the interpolation filter is specified by interpolation filter identification information, wherein the interpolation filter identification information indicates a type or filter coefficient of the interpolation filter.

10. The method of claim 1, wherein a slice type of the current prediction block corresponds to a bidirectional prediction type slice.

11. The method of claim 1, wherein the difference between the current prediction block and the first reference block includes a difference between a sum of the pixel values of the current prediction block and a sum of the pixel values of the first reference block.

12. The method of claim 1, wherein the difference between the current prediction block and the second reference block includes a difference between a sum of the pixel values of the current prediction block and a sum of the pixel values of the second reference block.

13. The method of claim 1, wherein the difference between the current prediction block and the first reference block includes a difference between an average of the pixel values of the current prediction block and an average of the pixel values of the first reference block.

14. The method of claim 1, wherein the difference between the current prediction block and the second reference block includes a difference between an average of the pixel values of the current prediction block and an average of the pixel values of the second reference block.

15. The method of claim 1, wherein the first weight information is obtained using the following equation:

$$W0=D1/(D0+D1),$$

where W0 denotes the first weight information, D0 denotes the difference between the current prediction block and the first reference block, and D1 denotes the difference between the current prediction block and the second reference block.

16. The method of claim 1, wherein the second weight information is obtained using the following equation:

$$W1=D0/(D0+D1),$$

where W1 denotes the second weight information, D0 denotes the difference between the current prediction block and the first reference block, and D1 denotes the difference between the current prediction block and the second reference block.

* * * * *